United States Patent
Li et al.

(10) Patent No.: US 11,301,114 B2
(45) Date of Patent: *Apr. 12, 2022

(54) METHOD AND APPARATUS FOR MANAGING NOTIFICATION BAR MESSAGE

(71) Applicant: Huawei Device Co., Ltd., Dongguan (CN)

(72) Inventors: Wei Li, Wuhan (CN); Wei Zhao, Shenzhen (CN); Zhishan Zhuang, Shanghai (CN)

(73) Assignee: Huawei Device Co., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/241,757

(22) Filed: Apr. 27, 2021

(65) Prior Publication Data

US 2021/0318793 A1 Oct. 14, 2021

Related U.S. Application Data

(63) Continuation of application No. 14/984,335, filed on Dec. 30, 2015, now Pat. No. 11,016,632, which is a
(Continued)

(51) Int. Cl.
*G06F 3/048* (2013.01)
*G06F 3/04817* (2022.01)
(Continued)

(52) U.S. Cl.
CPC .......... *G06F 3/04817* (2013.01); *G06F 9/451* (2018.02); *G06F 40/30* (2020.01);
(Continued)

(58) Field of Classification Search
CPC . G06F 3/0488; G06F 3/04883; G06F 3/04817
See application file for complete search history.

(56) References Cited

U.S. PATENT DOCUMENTS

| 5,485,506 | A | * | 1/1996 | Recht | H04M 1/651 |
|---|---|---|---|---|---|
| | | | | | 379/70 |
| 5,872,521 | A | * | 2/1999 | Lopatukin | G08B 5/227 |
| | | | | | 340/7.52 |

(Continued)

FOREIGN PATENT DOCUMENTS

| CN | 102801855 A | 11/2012 |
|---|---|---|
| CN | 102960000 A | 3/2013 |

(Continued)

OTHER PUBLICATIONS

Authors et al., Notification Presentation Across Multiple Devices; Jan. 5, 2018, IP; 41 pages.*

(Continued)

*Primary Examiner* — Linh K Pham
(74) *Attorney, Agent, or Firm* — Slater Matsil, LLP

(57) ABSTRACT

Embodiments of the present invention disclose a method and an apparatus for managing a notification bar message. The method includes: searching for a resident notification message; after the resident notification message is found, displaying, in a notification bar, prompt information prompting whether to delete the resident notification message; and if a user chooses to delete the resident notification message, deleting the resident notification message according to a system permission.

34 Claims, 6 Drawing Sheets

Related U.S. Application Data continuation of application No. PCT/CN2013/090162, filed on Dec. 20, 2013.

(51) Int. Cl.
*G06F 9/451* (2018.01)
*G06Q 30/02* (2012.01)
*G06F 40/30* (2020.01)
*H04M 1/724* (2021.01)

(52) U.S. Cl.
CPC ........ *G06Q 30/0267* (2013.01); *H04M 1/724* (2021.01); *H04M 2250/22* (2013.01)

(56) References Cited

U.S. PATENT DOCUMENTS

| | | | |
|---|---|---|---|
| 7,509,148 B1* | 3/2009 | Pisutha-Arnond | H04M 1/7243 455/567 |
| 8,539,063 B1 | 9/2013 | Sharma et al. | |
| 8,723,823 B2 | 5/2014 | Shia et al. | |
| 9,049,261 B2 | 6/2015 | Shiplacoff et al. | |
| 9,609,108 B2* | 3/2017 | Miura | H04M 1/72448 |
| 9,953,161 B2 | 4/2018 | Ding et al. | |
| 2006/0274701 A1 | 12/2006 | Albertsson | |
| 2008/0209452 A1 | 8/2008 | Ebert et al. | |
| 2010/0058231 A1* | 3/2010 | Duarte | H04M 1/72436 715/800 |
| 2011/0154390 A1* | 6/2011 | Smith | H04N 21/482 725/32 |
| 2012/0054683 A1 | 3/2012 | Sands et al. | |
| 2012/0117507 A1* | 5/2012 | Tseng | H04M 1/72436 715/774 |
| 2012/0236037 A1* | 9/2012 | Lessing | G06F 3/0484 345/661 |
| 2013/0007665 A1* | 1/2013 | Chaudhri | G06F 3/0481 715/830 |
| 2013/0145303 A1 | 6/2013 | Prakash et al. | |
| 2013/0290879 A1 | 10/2013 | Greisson | |
| 2013/0332856 A1* | 12/2013 | Sanders | G06F 3/0481 715/753 |
| 2014/0207916 A1 | 7/2014 | Li et al. | |
| 2014/0282085 A1* | 9/2014 | Hsu | H04L 51/24 715/752 |
| 2014/0310643 A1 | 10/2014 | Karmaneko et al. | |
| 2014/0378116 A1 | 12/2014 | Wang | |
| 2015/0365360 A1 | 12/2015 | Yuan et al. | |
| 2016/0028875 A1* | 1/2016 | Brown | G06F 3/0488 715/751 |

FOREIGN PATENT DOCUMENTS

| | | |
|---|---|---|
| CN | 103019681 A | 4/2013 |
| CN | 103064732 A | 4/2013 |
| CN | 103116722 A | 5/2013 |
| CN | 103179283 A | 6/2013 |
| CN | 103235688 A | 8/2013 |
| CN | 103309561 A | 9/2013 |
| CN | 103370924 A | 10/2013 |
| CN | 103404113 A | 11/2013 |
| CN | 103049274 B | 2/2017 |

OTHER PUBLICATIONS

Authors et. al_01; A Method to automatically hide sensitive information in notification page of Smartphone; Mar. 31, 2016; IP.com.*
Bhawani, A., "Turn OFF Status Bar Notifications of Incoming Mails on Android," Android Devices, Dec. 7, 2011, 6 pages.
Conder, S. et al., "Android Wireless Application Development," Second Edition, Chapters 1, 7, 20, Dec. 2010, 61 pages.
Mushishi, "Add Resident Notification", Retrieved from: https://www.cnblogs.com/mushishi/p/3394594.html, dated Oct. 29, 2013, 2 pages.
Ouyang, X., "[Help] There is no one key to clear all the notification bar all messages plug-ins," Feng.com, Jul. 8, 2013, 6 pages.
Huawei, "Refuse to annoy the push information to teach you to clear the Android notice column," Apr. 26, 2013, 11 pages.
Webopedia, "What is a flag?," Jun. 15, 2012, https://www.webopedia.com/TERM/F/flag.html, 2 pages.

* cited by examiner

METHOD AND APPARATUS FOR MANAGING NOTIFICATION BAR MESSAGE

CROSS-REFERENCE TO RELATED APPLICATIONS

This application is a continuation of U.S. patent application Ser. No. 14/984,335, filed on Dec. 30, 2015, which is a continuation of International Application No. PCT/CN2013/090162, filed on Dec. 20, 2013. Both of the aforementioned applications are hereby incorporated by reference in their entireties.

TECHNICAL FIELD

The present invention relates to the field of electronic device applications, and in particular, to a method and an apparatus for managing a notification bar message.

BACKGROUND

Generally, a message notification bar is displayed at the top of a screen of a smartphone, and is used to display a notification message for a user in a form of a small icon. A mobile phone allows a system or a third-party application to push a notification message to a notification bar, and a user may expand the notification message to view specific content of the notification message by performing a drop-down operation on the notification bar. For example, on an interface of a mobile phone desktop shown in FIG. 1, a horizontal bar area at the top of the interface is a notification bar, which includes a notification message such as a current battery level or signal strength pushed by a system of the mobile phone and also includes a notification message such as an unread message notification pushed by a third-party application.

With continuous development of a mobile phone application market and an explosive increase in a quantity of mobile phone applications, increasing more application software is installed on a mobile phone, and various applications often push notification messages to the notification bar to achieve different service objectives. A quantity of notification messages in the notification bar increases as the quantity of the mobile phone applications continuously increases, and a case in which the notification bar is full of icons occurs frequently.

To facilitate a user in clearing a notification message, an existing mobile phone provides a "one-tap deletion" function for a notification message, and the user may delete all notification messages in batches by tapping a "delete" button in a drop-down menu of a notification bar. This manner for managing a notification message is simple in operation, but cannot delete a resident notification message. A so-called resident notification message refers to a notification message for which a third-party application modifies a system setting so that the notification message resides in the notification bar and cannot be deleted, for example, a notification message such as a protection state pushed by a mobile phone security application. Regarding the foregoing problem, a method for clearing a resident notification message by using a third-party application has emerged in the prior art. In this method, a mobile phone management application displays, by using a menu, all application programs installed on a mobile phone, so that a user selects an application that will be prohibited from pushing a notification message. After a management setting is modified, the mobile phone management application shields, in a notification bar, a notification message from an application that is prohibited from pushing, where the notification message also includes a resident notification message.

In the foregoing process of shielding a resident notification message, the inventor finds that the prior art has at least the following problems: a manner in which a resident notification message is shielded by using a third-party application requires a user to separately install and start a mobile phone management application, which has a relatively deep multi-level menu and is relatively complex for the user to operate; in particular, when many applications are to be selected, it is time-consuming and laborious for the user to browse all the applications one by one and decide whether to prohibit pushing; therefore, the manner is very troublesome to use.

SUMMARY

Embodiments of the present invention provide a method and an apparatus for managing a notification bar message, which can resolve a problem of a tedious operation in clearing a resident notification message.

According to a first aspect, an embodiment of the present invention provides a method for managing a notification bar message, including: searching for a resident notification message; after the resident notification message is found, displaying, in a notification bar, prompt information prompting whether to delete the resident notification message; and if a user chooses to delete the resident notification message, deleting the resident notification message according to a system permission.

In a first possible implementation manner of the first aspect, the searching for a resident notification message includes: receiving, in the notification bar, a notification message deletion instruction; and searching for a resident notification message in a notification message to be deleted.

With reference to the first aspect, in a second possible implementation manner of the first aspect, the searching for a resident notification message includes: monitoring whether a new notification message is added to the notification bar; and if a new notification message is added to the notification bar, determining whether the newly added notification message is the resident notification message.

In the first aspect or the first and second possible implementation manners of the first aspect, a third possible implementation manner of the first aspect is further provided, where in the third possible implementation manner of the first aspect, the deleting the resident notification message according to a system permission includes: sending a resident notification message deletion request to an operating system according to the system permission, where the resident notification message deletion request carries an attribute flag used to indicate that the notification message is the resident notification message, so that the operating system deletes the resident notification message according to the attribute flag.

In the first aspect or the first to third possible implementation manners of the first aspect, a fourth possible implementation manner of the first aspect is further provided, where in the fourth possible implementation manner of the first aspect, after the searching for a resident notification message, the method further includes: displaying, in the notification bar, shielding prompt information, where the shielding prompt information is used to prompt whether to perform message pushing shielding for an application that pushes the resident notification message; and if the user chooses to perform message pushing shielding for the application, sending a push shielding request to the operating system according to the system permission, so that the operating system shields, according to the push shielding request, a notification message pushed by the application.

In the first aspect or the first to fourth possible implementation manners of the first aspect, a fifth possible implementation manner of the first aspect is further provided, where in the fifth possible implementation manner of the first aspect, after the searching for a resident notification message, the method further includes: displaying, in the notification bar, attribute modification prompt information, where the attribute modification prompt information is used to prompt whether to perform notification message attribute modification for an application that pushes the resident notification message; and if the user chooses to perform attribute modification for the application, sending an attribute modification request to the operating system according to the system permission, where the attribute modification request carries an attribute flag used to indicate that the notification message is the resident notification message, so that the operating system modifies, into a non-resident notification message according to the attribute flag, a notification message attribute of the application that pushes the resident notification message.

In the first aspect or the first to sixth possible implementation manners of the first aspect, a sixth possible implementation manner of the first aspect is further provided, where in the sixth possible implementation manner of the first aspect, after the searching for a resident notification message, the method further includes: performing a semantic analysis on the resident notification message; and if content of the resident notification message matches a preset content set, deleting the resident notification message.

According to a second aspect, an embodiment of the present invention further provides an apparatus for managing a notification bar message, including: a monitoring unit, configured to search for a resident notification message; a notifying unit, configured to: after the monitoring unit finds the resident notification message, display, in a notification bar, prompt information prompting whether to delete the resident notification message; and a processing unit, configured to: when a user chooses, according to a prompt from the notifying unit, to delete the resident notification message, delete, according to a system permission, the resident notification message that is found by the monitoring unit.

In a first possible implementation manner of the second aspect, the monitoring unit includes: a receiving subunit, configured to receive, in the notification bar, a notification message deletion instruction; and a searching subunit, configured to: after the receiving subunit receives the notification message deletion instruction, search for a resident notification message in a notification message to be deleted.

In the second aspect or the first possible implementation manner of the second aspect, a second possible implementation manner of the second aspect is further provided, where in the second possible implementation manner of the second aspect, the monitoring unit includes: a monitoring subunit, configured to monitor whether a new notification message is added to the notification bar; and a determining subunit, configured to: when the monitoring subunit finds, by means of monitoring, that a new notification message is added to the notification bar, determine whether the newly added notification message is a resident notification message.

In the second aspect or the first to third possible implementation manners of the second aspect, a third possible implementation manner of the second aspect is further provided, where in the third possible implementation manner of the second aspect, the processing unit is configured to send a resident notification message deletion request to an operating system according to the system permission, where the resident notification message deletion request carries an attribute flag used to indicate that the notification message is the resident notification message, so that the operating system deletes the resident notification message according to the attribute flag.

In the second aspect or the first to fourth possible implementation manners of the second aspect, a fourth possible implementation manner of the second aspect is further provided, where in the fourth possible implementation manner of the second aspect, the notifying unit is configured to: after the monitoring unit searches for the resident notification message, display, in the notification bar, shielding prompt information, where the shielding prompt information is used to prompt whether to perform message pushing shielding for an application that pushes the resident notification message; and the processing unit is configured to: when the user chooses, according to a prompt from the notifying unit, to perform message pushing shielding for the application, send a push shielding request to the operating system according to the system permission, so that the operating system shields, according to the push shielding request, a notification message pushed by the application.

In the second aspect or the first to fifth possible implementation manners of the second aspect, a fifth possible implementation manner of the second aspect is further provided, where in the fifth possible implementation manner of the second aspect, the notifying unit is configured to: after the monitoring unit searches for the resident notification message, display, in the notification bar, attribute modification prompt information, where the attribute modification prompt information is used to prompt whether to perform notification message attribute modification for an application that pushes the resident notification message; the processing unit is configured to: when the user chooses, according to a prompt from the notifying unit, to perform attribute modification for the application, send an attribute modification request to the operating system according to the system permission, where the attribute modification request carries an attribute flag used to indicate that the notification message is the resident notification message, so that the operating system modifies, into a non-resident notification message according to the attribute flag, a notification message attribute of the application that pushes the resident notification message.

In the second aspect or the first to sixth possible implementation manners of the second aspect, a sixth possible implementation manner of the second aspect is provided, where in the sixth possible implementation manner of the second aspect, the apparatus further includes: a screening unit, configured to perform a semantic analysis on the resident notification message after the monitoring unit searches for the resident notification message; where the processing unit is configured to delete the resident notification message when the screening unit finds, by means of an analysis, that content of the resident notification message matches a preset content set.

According to a third aspect, an embodiment of the present invention further provides an apparatus for managing a notification bar message, including: a monitoring circuit, configured to search for a resident notification message; an input and output circuit, configured to: after the monitoring circuit finds the resident notification message, display, in a notification bar, prompt information prompting whether to delete the resident notification message; and a processor, configured to: when a user chooses, according to a prompt from the input and output circuit, to delete the resident notification message, delete, according to a system permission, the resident notification message that is found by the monitoring circuit.

In a first possible implementation manner of the third aspect, the monitoring circuit is configured to receive, in the notification bar, a notification message deletion instruction, and after receiving the notification message deletion instruction, search for a resident notification message in a notification message to be deleted.

In the third aspect or the first possible implementation manner of the third aspect, a second possible implementation manner of the third aspect is further provided, where in the second possible implementation manner of the third aspect, the monitoring circuit is configured to monitor whether a new notification message is added to the notification bar, and when it is found, by means of monitoring, that a new notification message is added to the notification bar, determine whether the newly added notification message is the resident notification message.

In the third aspect or the first and second possible implementation manners of the third aspect, a third possible implementation manner of the third aspect is further provided, where in the third possible implementation manner of the third aspect, the processor is configured to send a resident notification message deletion request to an operating system according to the system permission, where the resident notification message deletion request carries an attribute flag used to indicate that the notification message is the resident notification message, so that the operating system deletes the resident notification message according to the attribute flag.

In the third aspect or the first to third possible implementation manners of the third aspect, a fourth possible implementation manner of the third aspect is further provided, where in the fourth possible implementation manner of the third aspect, the input and output circuit is configured to: after the monitoring circuit searches for the resident notification message, display, in the notification bar, shielding prompt information, where the shielding prompt information is used to prompt whether to perform message pushing shielding for an application that pushes the resident notification message; and the processor is configured to: when the user chooses, according to a prompt from the input and output circuit, to perform message pushing shielding for the application, send a push shielding request to the operating system according to the system permission, so that the operating system shields, according to the push shielding request, a notification message pushed by the application.

In the third aspect or the first to fourth possible implementation manners of the third aspect, a fifth possible implementation manner of the third aspect is further provided, where in the fifth possible implementation manner of the third aspect, the input and output unit is configured to: after the monitoring circuit searches for the resident notification message, display, in the notification bar, attribute modification prompt information, where the attribute modification prompt information is used to prompt whether to perform notification message attribute modification for an application that pushes the resident notification message; and the processor is configured to: when the user chooses, according to a prompt from the input and output circuit, to perform attribute modification for the application, send an attribute modification request to the operating system according to the system permission, where the attribute modification request carries an attribute flag used to indicate that the notification message is the resident notification message, so that the operating system modifies, into a non-resident notification message according to the attribute flag, a notification message attribute of the application that pushes the resident notification message.

In the third aspect or the first to fifth possible implementation manners of the third aspect, a sixth possible implementation manner of the third aspect is further provided, where in the sixth possible implementation manner of the third aspect, the processor is further configured to perform a semantic analysis on the resident notification message after the monitoring circuit searches for the resident notification message, and delete the resident notification message when it is found, by means of an analysis, that content of the resident notification message matches a preset content set.

According to the method and apparatus for managing a notification bar message that are provided in the embodiments of the present invention, a resident notification message can be searched for in a notification bar; after the resident notification message is found, prompt information prompting whether to delete the resident notification message is displayed in the notification bar, so as to facilitate choosing performed by a user; and if the user chooses to delete the resident notification message, the resident notification message is deleted according to a system permission. Unlike that a third-party application is used to shield a resident notification message in the prior art, a resident notification message may be directly deleted by using an operating system of a mobile phone, and third-party application does not need to be installed, which facilitates a user operation.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
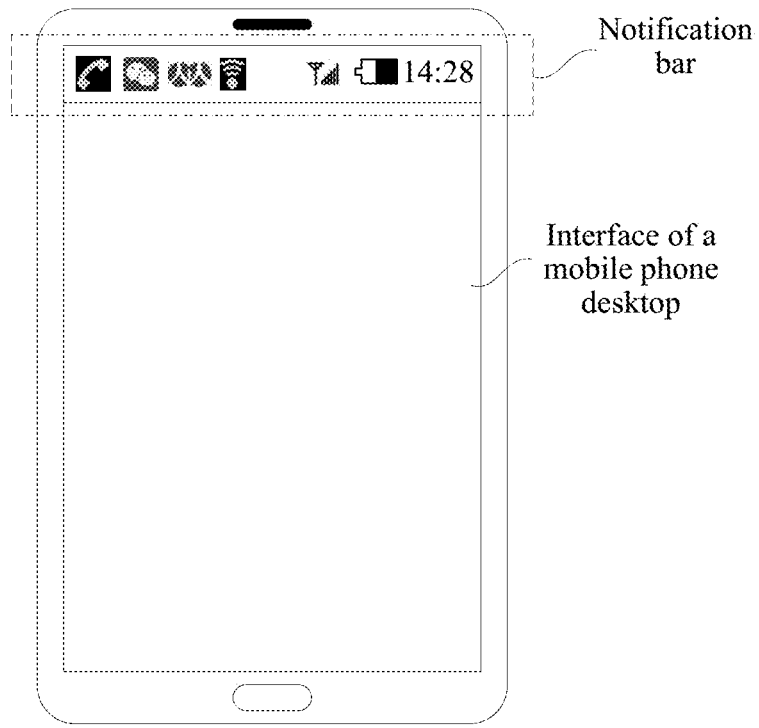
FIG. 1 is a schematic diagram of an interface of a notification bar in the prior art.
Figure 2:
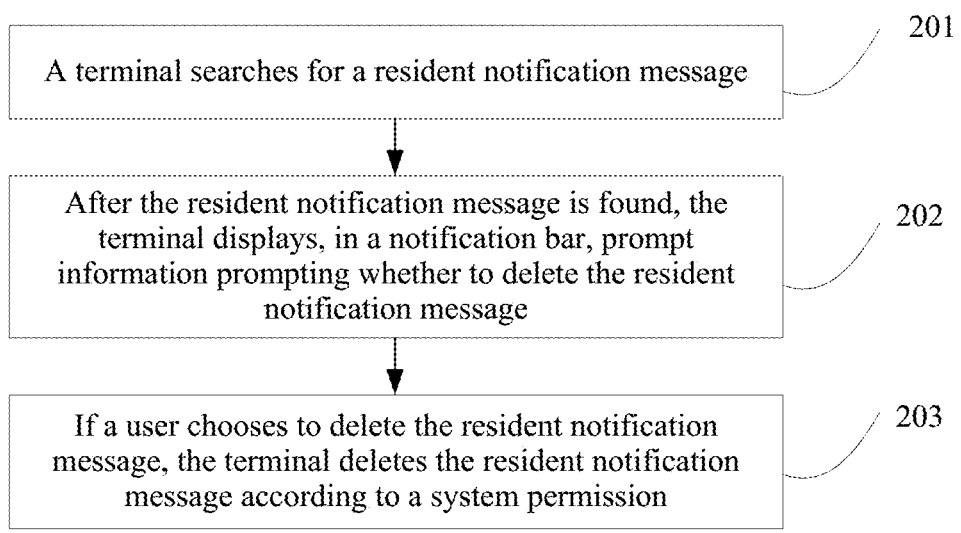
FIG. 2 is a schematic flowchart of a first method for managing a notification bar message according to an embodiment of the present invention.

To avoid a problem of a deep multi-level menu and tedious operations when a third-party application is used to shield a resident notification message, an embodiment provides a method for managing a notification bar message, where the method may be applied to a terminal such as a mobile phone or a computer. As shown in FIG. 2, the method includes:

201. A terminal searches for a resident notification message.

Generally, when sending a notification message, a third-party application may request an operating system of the terminal to set a resident notification message; for a notification message that needs to be set as a resident notification message, the operating system marks it as resident. When searching for the resident notification message, the terminal traverses notification messages in a notification bar, and searches for the resident notification message according to a flag bit of the notification message.

After the resident notification message is found, the terminal marks the found resident notification message by using a means of interface marking, so as to facilitate viewing by a user. In this embodiment, no limitation is set on a means of marking the resident notification message. The terminal may sort and display, in the notification bar, all acquired notification messages, and mark a resident notification message in the acquired notification messages by using a mark symbol or a background mark (such as a highlighted background); or the terminal may display, in the notification bar, only a resident notification message after a non-resident notification message is deleted according to a delete message instruction triggered by the user. In addition, in this embodiment, no limitation is set on a moment at which the terminal searches for the resident notification message. The terminal may acquire all notification messages including the resident notification message when the user performs a drop-down operation on the notification bar and search for the resident notification message in all the notification messages, or may search for the resident notification message by using a background process according to a preset polling period.

In an implementation manner of this embodiment, the user first performs a drop-down operation on the notification bar to expand the notification bar, and then triggers a message batch deletion instruction; the terminal deletes all non-resident notification messages, and then displays, in the notification bar, a remaining resident notification message. Exemplarily, an interface of a notification bar on which a resident notification message is retained is shown in FIG. 3.

202. After the resident notification message is found, the terminal displays, in a notification bar, prompt information prompting whether to delete the resident notification message.

Figure 3:
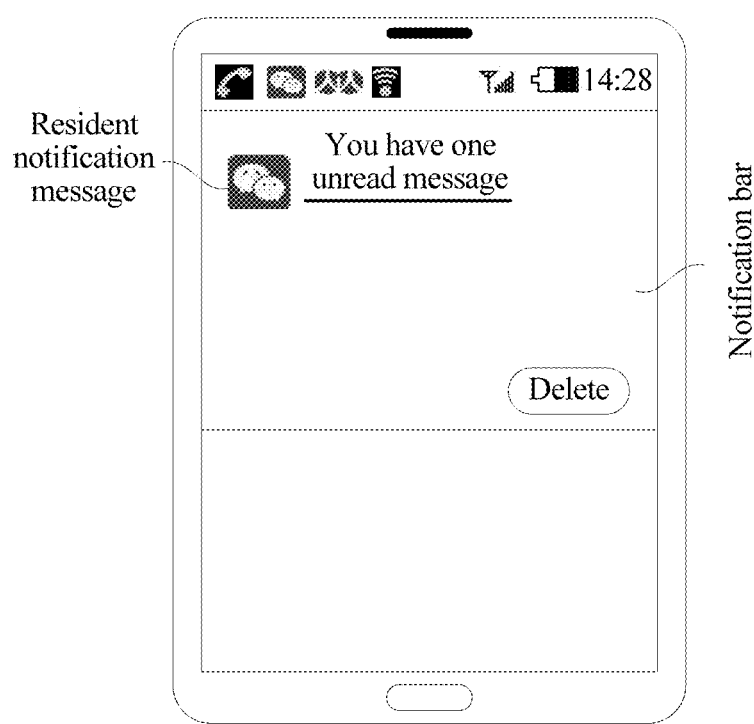
FIG. 3 is a schematic diagram of a first interface of a notification bar according to an embodiment of the present invention.

Regarding an implementation manner shown in FIG. 3, the terminal displays, in the notification bar, the prompt information prompting whether to delete the resident notification message, where the prompt information may be used to prompt whether to delete all resident notification messages in the notification bar in batches; or may display prompt information displayed for each resident notification message. In addition, when displaying the prompt information, the terminal may display, below the resident notification message (but not limited to being below the resident notification message), a dialog box, together with the resident notification message, prompting whether to delete the resident notification message, and provide "delete" and "cancel" buttons; or the terminal may set a next-level menu for a deletion operation on the resident notification message, and display prompt information and an operation button in the next-level menu.

Figure 4:
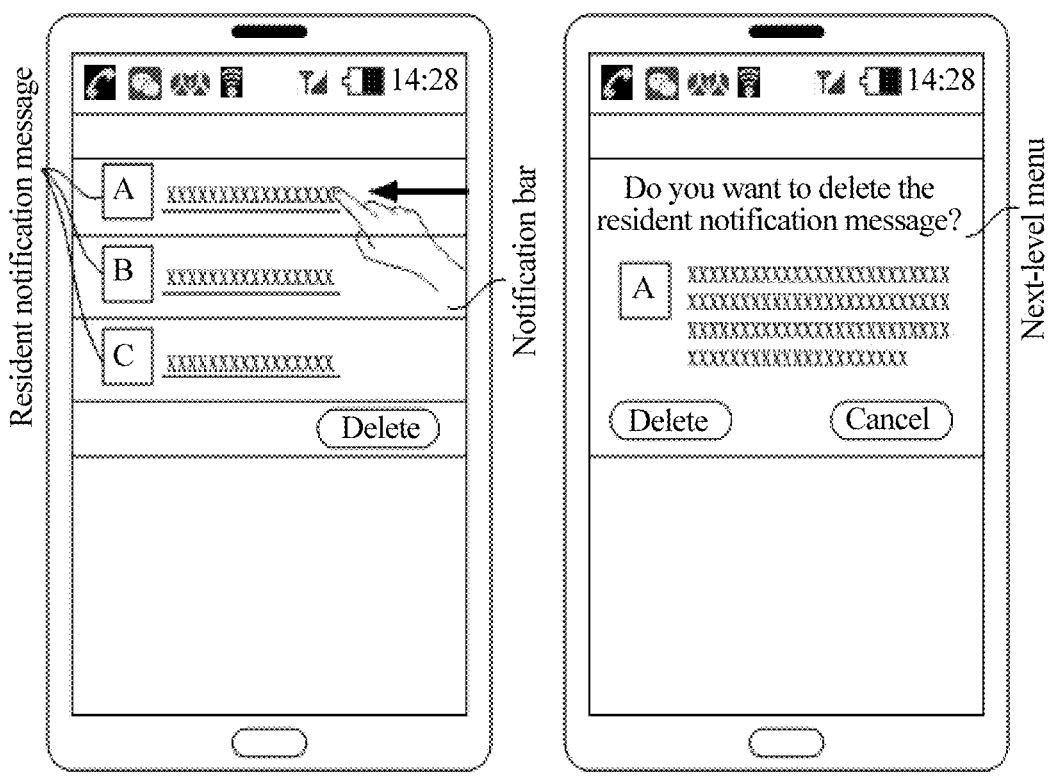
FIG. 4 is a schematic diagram of a second interface of a notification bar according to an embodiment of the present invention.

As shown in FIG. 4, in another implementation manner of this embodiment, to facilitate the user in flexibly processing a resident notification message, the terminal respectively displays prompt information for different resident notification messages; in addition, to simplify an interface layout of a notification bar, the terminal sets a next-level menu level for a deletion operation on a resident notification message. As shown on the left side in FIG. 4, after a non-resident notification message is deleted, the terminal displays, in the notification bar, three resident notification messages A, B, and C in a form of a list; the user slides left on an icon of the resident notification message A on a touchscreen to trigger a next-level delete prompt menu. As shown on the right side in FIG. 4, prompt information prompting the user whether to delete the resident notification message is displayed in the delete prompt menu; in addition, both "delete" and "cancel" buttons are provided for the user.

203. If a user chooses to delete the resident notification message, the terminal deletes the resident notification message according to a system permission.

After the user triggers the "delete" button in the delete prompt menu on the right side in FIG. 4, the terminal deletes the resident notification message A that is selected by the user in the notification bar on the left side in FIG. 4. In this embodiment, the terminal sends a deletion request to the operating system according to the system permission, so that the operating system deletes the resident notification message selected by the user.

In the method for managing a notification bar message according to this embodiment, a resident notification message can be searched for in a notification bar; after the resident notification message is found, prompt information prompting whether to delete the resident notification message is displayed in the notification bar, so as to facilitate choosing performed by a user; and if the user chooses to delete the resident notification message, the resident notification message is deleted according to a system permission. Unlike that a third-party application is used to shield a resident notification message in the prior art, a resident notification message may be directly deleted from the notification bar by using an operating system of a mobile phone, and third-party application does not need to be installed, which facilitates a user operation.

In addition, unlike that a third-party application is used to shield a resident notification message in the prior art, the method for managing a notification bar message according to this embodiment can further effectively resolve several technical problems as follows:

(1) Shielding a Notification Message Affects a User in Acquiring a Useful Notification Message.

In the prior art, a third-party application shields a resident notification message selected by a user; after the shielding, an application that pushes the resident notification message cannot push another notification message to a notification bar any longer. Such a message shielding manner can achieve an objective of deleting a resident notification message; however, it also shields some notification messages that are useful to the user, which affects the user in acquiring sufficient information. The method for managing a notification bar message according to this embodiment mainly focuses on deleting an individual resident notification message instead of shielding a notification message pushing capability of an application, and deleting a current resident notification message does not affect pushing of a subsequent notification message, which may ensure that the user can sufficiently acquire valid information.

(2) A Third-Party Application Acquires a ROOT Permission.

Generally, a corresponding operation permission needs to be acquired to set whether a notification message is resident; a system permission of a terminal is a permission higher than a permission to set a resident notification message. In the prior art, a third-party application is independent of an operating system of a terminal, and cannot acquire an operation permission of the terminal; therefore, a highest ROOT permission (which is higher than the system permission) is usually acquired directly to achieve an objective of setting a resident notification message. Because the ROOT permission is the highest permission on the terminal and can be used to perform setting modification on multiple critical parameters on the terminal, there is a relatively high security risk if the ROOT permission is acquired by a third-party application. In the method for managing a notification bar message according to this embodiment, deletion of a resident notification message is implemented completely based on the operating system of the terminal, and no third-party application needs to participate, which can provide a relatively closed protection environment for a terminal permission in a process of deleting a resident notification message, so as to ensure security of the terminal permission.

(3) A Main Application Retains a Notification Message Pushed by Itself.

In the prior art, although a third-party application can shield a resident notification message, in consideration of a service objective, the third-party application usually retains various notification messages pushed by the third-party application. For example, some mobile phone security management applications usually retain, in a notification bar, their resident icons for forced brand embedding. In the method for managing a notification bar message according to this embodiment, a resident notification message is deleted completely based on an operating system of a terminal, which is independent of any third-party application, so that notification messages pushed by all applications can be completely deleted to ensure rights and interests of a user.

Figure 5:
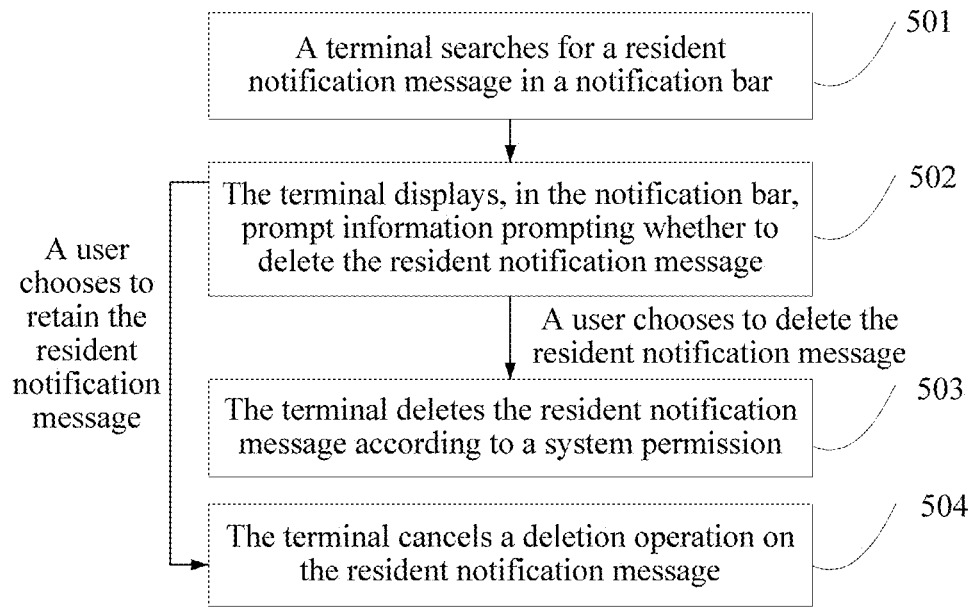
FIG. 5 is a schematic flowchart of a second method for managing a notification bar message according to an embodiment of the present invention.

Further, to provide a refinement and extension for the method shown in FIG. 2, an embodiment provides a method for managing a notification bar message. As shown in FIG. 5, the method includes:

501. A terminal searches for a resident notification message in a notification bar.

Figure 6:
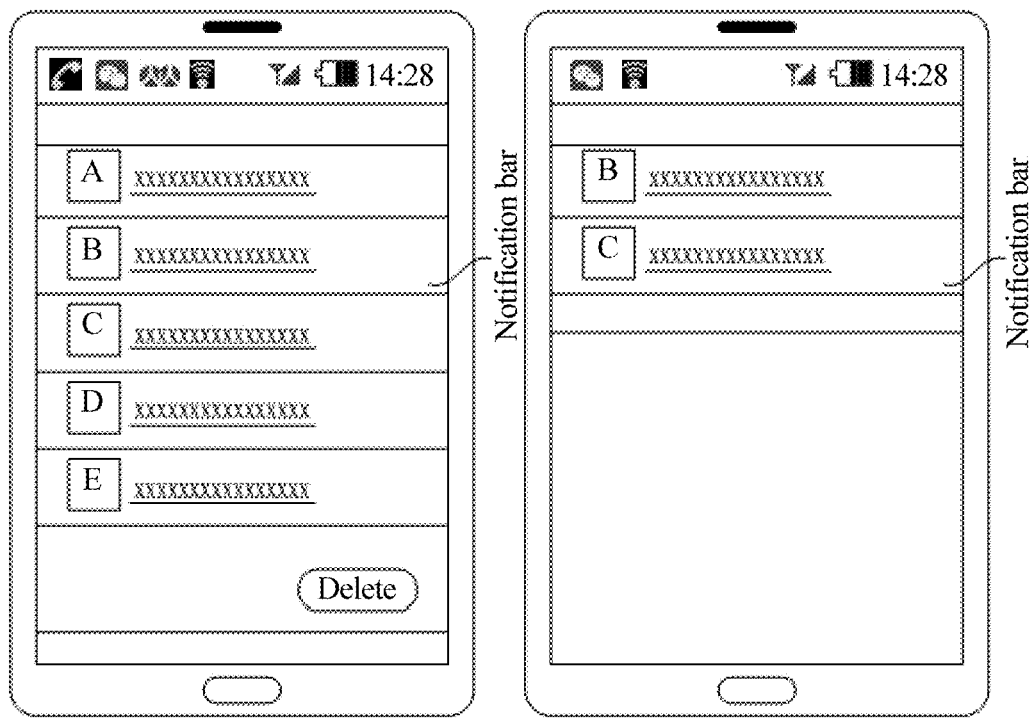
FIG. 6 is a schematic diagram of a third interface of a notification bar according to an embodiment of the present invention.

In an implementation manner of this embodiment, the terminal receives, in the notification bar, a notification message deletion instruction, and searches for a resident notification message in a notification message to be deleted. Exemplarily, a user performs a drop-down operation on a notification bar at the top of a screen. As shown on the left side in FIG. 6, an expanded notification bar displays five notification messages A, B, C, D, and E, and a content summary of each of the notification messages. After the user triggers a notification message deletion button, the terminal traverses the five notification messages one by one; the terminal directly deletes each non-resident notification message, and retains each resident notification message. The notification bar obtained after each non-resident notification message is deleted is shown on the right side in FIG. 6, which retains and displays only the resident notification messages B and C.

Figure 7:
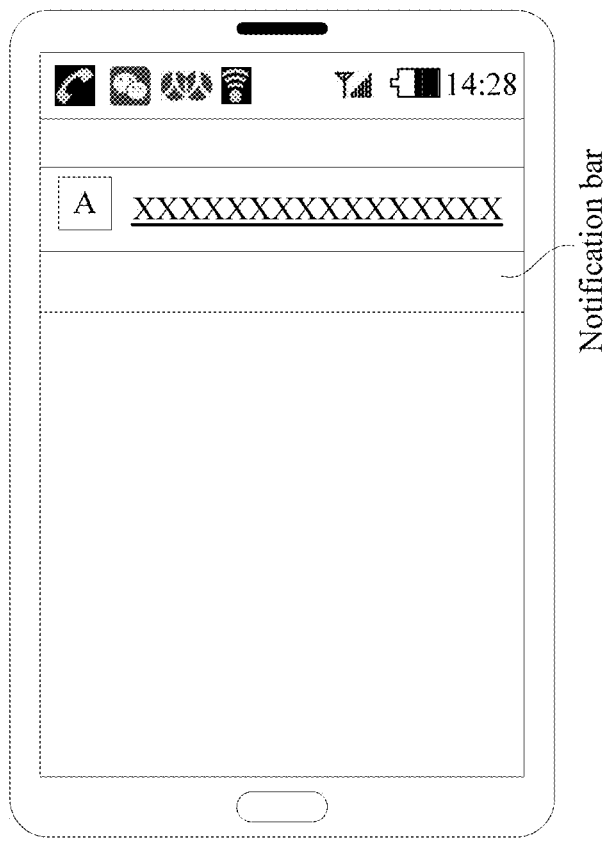
FIG. 7 is a schematic diagram of a fourth interface of a notification bar according to an embodiment of the present invention.

In another implementation manner of this embodiment, the terminal may also automatically search for a newly pushed resident notification message. Specifically, the terminal monitors, in real time, whether a new notification message is added to the notification bar; if a new notification message is added to the notification bar, the terminal determines whether the newly added notification message is a resident notification message. If the newly added notification message is a resident notification message, as shown in FIG. 7, the terminal automatically expands the notification bar, and displays, in the notification bar, the resident notification message and its content summary. This implementation manner focuses only on a resident notification message, and in this embodiment, no limitation is set on whether the expanded notification bar displays a non-resident notification message that has been added earlier. In addition, in this embodiment, no limitation is set on whether a resident notification message that has been added earlier but has not been processed is displayed in the notification bar shown in FIG. 7. Preferably, after the notification bar is expanded, the terminal may display, together with the newly added resident notification message, a resident notification message that has been added earlier but has not been processed.

502. The terminal displays, in the notification bar, prompt information prompting whether to delete a resident notification message.

Similar to step 202 in FIG. 2, the terminal expands a next-level menu for a resident notification message selected by the user, so as to prompt the user and receive a subsequent operation instruction. Details are not described herein again.

If the user chooses to delete the selected resident notification message, the terminal executes step 503; and if the user cancels deletion of the selected resident notification message, the terminal executes step 504.

503. The terminal deletes the resident notification message according to a system permission.

Specifically, for the resident notification message that is selected by the user and to be deleted, the terminal sends a resident notification message deletion request to the operating system according to a system permission of the terminal, where the request carries a message identifier of the resident notification message and/or an application identifier of an application that pushes the resident notification message, so that the system locks the resident notification message to be deleted. In an exemplary preferred solution of this embodiment, the terminal may further add an attribute flag to the resident notification message deletion request, where the attribute flag is used to indicate that a notification message to be deleted is a resident notification message, so that the operating system may quickly differentiate whether the notification message to be deleted is a resident notification message. The terminal may assign a specified flag as an attribute flag to the resident notification message according to a preset rule, or may use a flag (that is, the flag bit in step 201 in FIG. 2) obtained when searching for the resident notification message as an attribute flag and add the flag to the request. In this embodiment, no limitation is set on a specific form of the attribute flag. In an actual application, the attribute flag may be one bit, or a string including multiple bits.

After receiving the resident notification message deletion request, the operating system searches, according to the message identifier in the deletion request, for the notification message to be deleted, and then determines, according to the attribute flag in the deletion request, whether the notification message is a resident notification message. The operating system changes a flag bit of the resident notification message into a "non-resident notification message", and finally deletes the resident notification message from the notification bar.

504. The terminal cancels a deletion operation on the resident notification message.

For a retained resident notification message, the terminal withdraws the next-level menu or may directly withdraw the notification bar, and retains, in the withdrawn notification bar, a thumbnail icon of the resident notification message.

In another implementation manner of this embodiment, the terminal may also allow the user to set a service time range for deleting a resident notification message, for example, to set a time range between 7:00 and 19:00 every day for deleting a resident notification message. In the service time range, the terminal deletes a resident notification message in the notification bar according to an operation instruction of the user in an implementation manner shown in FIG. 2 or FIG. 5. In addition, the terminal may also allow the user to set a time range for deleting a resident notification message, for example, to set a time range between 7:00 and 19:00 every day for deleting a resident notification message. Unlike the foregoing service time range, the time range is used to set a constraint on a moment at which a resident notification message is pushed. The terminal deletes only a resident notification message that is pushed within the time range, so that resident notification message may be managed in a more flexible manner to meet use requirements of different users.

In addition, when a resident notification message is found or a resident notification message is deleted, the terminal may also prompt the user by audio, brightness, or vibration by using an output device such as a speaker, a screen, or an actuator, and automatically select a suitable prompt manner according to parameters in different dimensions such as current time and a scenario mode, so as to avoid disturbing the user.

Further, as a further extension to the foregoing method, to facilitate the user in managing a resident notification message, in another implementation manner of this embodiment, the terminal may also display shielding prompt information after executing step 201 in FIG. 2 or step 501 in FIG. 5, so that the user may perform a shielding setting for an application that pushes a resident notification message, so as to avoid a tedious operation of constantly and subsequently receiving and deleting resident notification messages in the future. Specifically, the terminal displays, in the notification bar, shielding prompt information that is used to prompt whether to perform message pushing shielding for an application that pushes the resident notification message. Similar to displaying the prompt information for deleting a resident notification message, the terminal may display, below the resident notification message (not limited to being below the resident notification message), prompt information prompting whether to shield a push function of the message application that pushes the resident notification message, and display "shield" and "cancel" buttons; or similar to a manner shown on the right side in FIG. 4, the terminal may display the prompt information and functional buttons by using a next-level menu. In this embodiment, no limitation is set on a specific form of the shielding prompt information.

After the user chooses to perform message pushing shielding for the application, the terminal sends a push shielding request to the operating system according to a system permission of the terminal, so that the operating system shields, according to the push shielding request, a resident notification message pushed by the application. Specifically, the terminal may add a message identifier of the resident notification message and/or an application identifier of a corresponding application to the push shielding request. The operating system searches for an associated application identifier according to the message identifier and further searches for an application to be shielded, or directly searches, according to the application identifier in the request, for the application to be shield; and then shields a message push function of the application. The shielded application cannot push any notification message to the notification bar.

In a preferred solution of the foregoing implementation manner, when performing a shielding setting on the application that pushes a resident notification message, the terminal may further delete a resident notification message that has been pushed by the application, that is, deleting a resident notification message that is currently in the notification bar, selected by the user, and needs to be shielded. An implementation manner in which the resident notification message is deleted is the same as the implementation manner of step 202 and step 203 in FIG. 2, and details are not described herein again.

Still further, as a further extension to the foregoing method, to facilitate the user in quickly deleting a resident notification message that is subsequently pushed, in another implementation manner of this embodiment, after executing step 201 in FIG. 2 or step 501 in FIG. 5, the terminal may also display attribute modification prompt information to prompt that the user may change an attribute of a notification message pushed by an application into a "non-resident notification message", so that the user may subsequently delete the notification messages together with an existing non-resident notification message by one tap. Specifically, the terminal displays, in the notification bar, attribute modification prompt information that is used to prompt whether to perform notification message attribute modification for an application that pushes a resident notification message. Similar to displaying the prompt information for deleting a resident notification message, the terminal may display, below the resident notification message (not limited to being below the resident notification message), the attribute modification prompt information, and display "shield" and "cancel" buttons; or similar to a manner shown on the right side in FIG. 4, the terminal may display the attribute modification prompt information and functional buttons by using a next-level menu. In this embodiment, no limitation is set on a specific form of the attribute modification prompt information.

After the user chooses to modify the attribute of the notification message, the terminal sends an attribute modification request to the operating system according to a system permission of the terminal, so that the operating system modifies, into a non-resident notification message, an attribute of a notification message from an application that pushes a resident notification message. Specifically, the terminal may add a message identifier of the resident notification message and/or an application identifier of a corresponding application to the attribute modification request. The operating system searches for an associated application identifier according to the message identifier and further searches for an application for which attribute modification is to be performed, or directly searches, according to the application identifier in the request, an application for which attribute modification is to be performed; and then modifies, into a non-resident notification message, an attribute of a notification message from the application. Any notification message that is subsequently pushed by the application is a non-resident notification message, and the user may delete, in the drop-down notification bar, all non-resident notification messages by using a "delete" button, and can implement quick deletion of resident notification messages without shielding a notification message, which further simplifies user operations.

Finally, in an implementation manner of this embodiment, to reduce a quantity of notification messages pushed to the notification bar, and ensure that a notification message that is useful to the user may be displayed in the notification bar to the maximum extent, the terminal may further selectively display a notification message (including a resident notification message and a non-resident notification message) that is pushed to the notification bar. The terminal may display a notification message selectively based on a preset time range, for example, displaying, in the notification bar, a notification message that is pushed by each applications within a preset time range, and does not display a notification message that is pushed outside the preset time range. The terminal acquires, by means of learning and training on the basis of a behavior habit of the user, a time range within which useful notification messages occur at a relatively high frequency, and determines and uses the time range as the preset time range; or may receive a preset time range that is sent by a network side and obtained by a network side server by training on the basis of a large quantity of user samples. In addition, the terminal may also poll, based on a preset rule, multiple pushed notification messages, and select and display some of the notification messages, so as to reduce the quantity of notification messages in the notification bar on a basis of providing a display possibility of useful notification messages and according to a probability rate rule. For example, according to a "one in three" rule, the terminal randomly selects and displays one notification message in every three notification messages, or randomly selects and displays a notification message that is pushed by one application and that is in notification messages sent by every three different applications. In addition, the terminal may also use a random algorithm to select and display a specific quantity of notification messages in a different dimension such as push time or the quantity of notification messages.

While reducing the quantity of notification messages, to further accurately retain a notification message that is useful to the user, the terminal may also perform a semantic analysis on content of a resident notification message after a resident notification message is found, so as to determine whether the resident notification message is useful to the user; and display, in the notification bar, the resident notification message if the resident notification message is useful, and does not display the resident notification message if the resident notification message is not useful. Specifically, the terminal acquires, by means of learning and training on the basis of a quantity of times for which the user expands and browses resident notification messages, a preset content set in advance, where a notification message in the content set is a notification message that is useless to the user. For example, for some resident notification messages that the user seldom open and browse their specific content, such resident notification messages may be put in the content set. After a resident notification message is found, the terminal performs a semantic analysis on the resident notification message, and deletes the resident notification message if content of the resident notification message matches the preset content set. In addition, the terminal may also send the found resident notification message to a network side server, and the network side server performing learning and training on the basis of behavior habits of multiple users, and sends a content set as a result of the training to a terminal for use.

Figure 8:
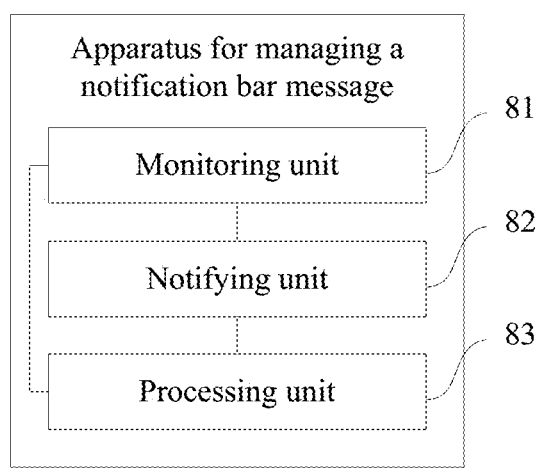
FIG. 8 is a schematic structural diagram of a first apparatus for managing a notification bar message according to an embodiment of the present invention.

As an implementation manner of the foregoing method, an embodiment provides an apparatus for managing a notification bar message, where the apparatus may be located in an electronic device such as a mobile phone or a computer, and is configured to implement the foregoing method. As shown in FIG. 8, the apparatus includes a monitoring unit 81, a notifying unit 82, and a processing unit 83, where:

the monitoring unit 81 is configured to search for a resident notification message;

the notifying unit 82 is configured to: after the monitoring unit 81 finds the resident notification message, display, in a notification bar, prompt information prompting whether to delete the resident notification message; and the processing unit 83 is configured to: when a user chooses, according to a prompt from the notifying unit 82, to delete the resident notification message, delete, according to a system permission, the resident notification message that is found by the monitoring unit 81.

Figure 9:
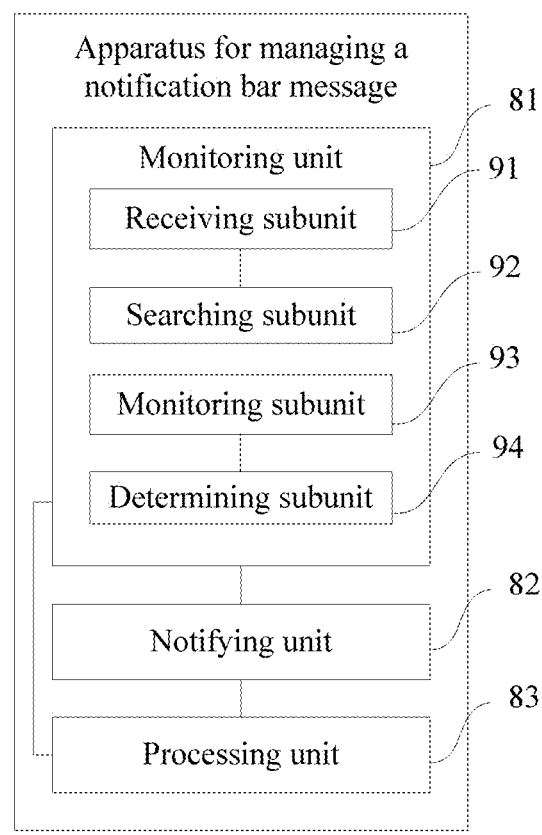
FIG. 9 is a schematic structural diagram of a second apparatus for managing a notification bar message according to an embodiment of the present invention.

Further, as shown in FIG. 9, the monitoring unit 81 includes:

a receiving subunit 91, configured to receive, in the notification bar, a notification message deletion instruction; and a searching subunit 92, configured to: after the receiving subunit 91 receives the notification message deletion instruction, search for a resident notification message in a notification message to be deleted.

Further, as shown in FIG. 9, the monitoring unit 81 includes: a monitoring subunit 93, configured to monitor whether a new notification message is added to the notification bar; and a determining subunit 94, configured to: when the monitoring subunit 93 finds, by means of monitoring, that a new notification message is added to the notification bar, determine whether the newly added notification message is a resident notification message.

Further, the processing unit 83 is configured to send a resident notification message deletion request to an operating system according to the system permission, where the resident notification message deletion request carries an attribute flag used to indicate that the notification message is the resident notification message, so that the operating system deletes the resident notification message according to the attribute flag.

Further, the notifying unit 82 is configured to: after the monitoring unit 81 searches for the resident notification message, display, in the notification bar, shielding prompt information, where the shielding prompt information is used to prompt whether to perform message pushing shielding for an application that pushes the resident notification message; where the processing unit 83 is configured to: when the user chooses, according to a prompt from the notifying unit 82, to perform message pushing shielding for the application, send a push shielding request to the operating system according to the system permission, so that the operating system shields, according to the push shielding request, a notification message pushed by the application.

Further, the notifying unit 82 is configured to: after the monitoring unit 81 searches for the resident notification message, display, in the notification bar, attribute modification prompt information, where the attribute modification prompt information is used to prompt whether to perform notification message attribute modification for an application that pushes the resident notification message.

The processing unit 83 is configured to: when the user chooses, according to a prompt from the notifying unit 82, to perform attribute modification for the application, send an attribute modification request to the operating system according to the system permission, where the attribute modification request carries an attribute flag used to indicate that the notification message is the resident notification message, so that the operating system modifies, into a non-resident notification message according to the attribute flag, a notification message attribute of the application that pushes the resident notification message.

Figure 10:
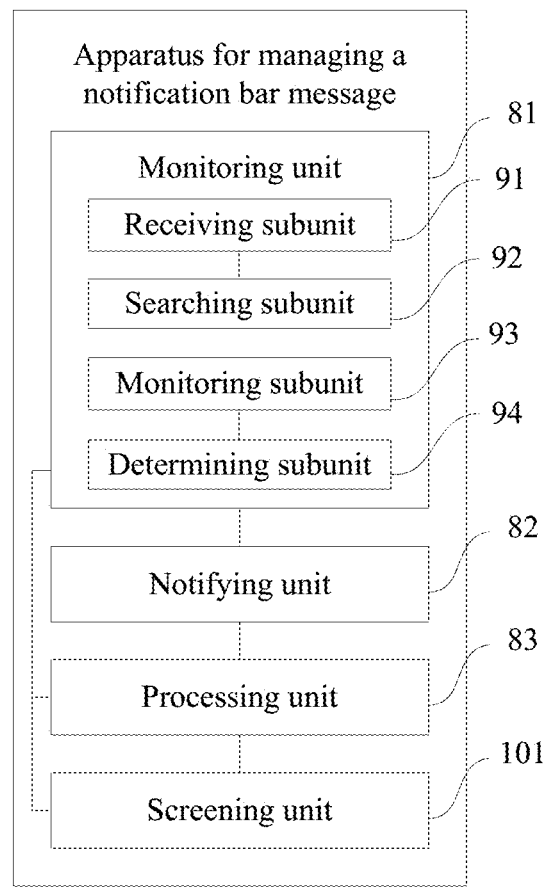
FIG. 10 is a schematic structural diagram of a third apparatus for managing a notification bar message according to an embodiment of the present invention.

Further, as shown in FIG. 10, the apparatus further includes: a screening unit 101, configured to perform a semantic analysis on the resident notification message after the monitoring unit 81 searches for the resident notification message; where the processing unit 83 is configured to delete the resident notification message when the screening unit 101 finds, by means of an analysis, that content of the resident notification message matches a preset content set.

The apparatus for managing a notification bar message according to this embodiment of the present invention can search, in a notification bar, for a resident notification message; after the resident notification message is found, display, in the notification bar, prompt information prompting whether to delete the resident notification message, so as to facilitate choosing performed by a user; and if the user chooses to delete the resident notification message, delete the resident notification message according to a system permission. Unlike that a third-party application is used to shield a resident notification message in the prior art, a resident notification message may be directly deleted by using an operating system of a mobile phone, and third-party application does not need to be installed, which facilitates a user operation.

Figure 11:
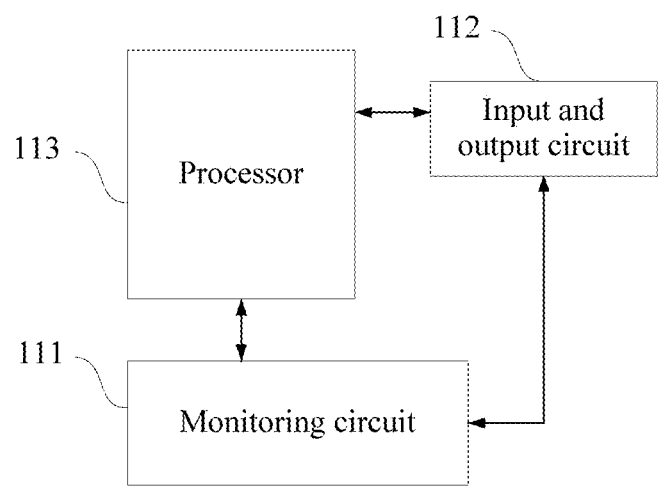
FIG. 11 is a schematic structural diagram of a fourth apparatus for managing a notification bar message according to an embodiment of the present invention.

As an implementation manner of the foregoing method, an embodiment provides an apparatus for managing a notification bar message, where the apparatus may be located in an electronic device such as a mobile phone or a computer, and is configured to implement the foregoing method. As shown in FIG. 11, the apparatus includes a monitoring circuit 111, an input and output circuit 112, and a processor 113, where: the monitoring circuit 111 is configured to search for a resident notification message; the input and output circuit 112 is configured to: after the monitoring circuit 111 finds the resident notification message, display, in a notification bar, prompt information prompting whether to delete the resident notification message; and the processor 113 is configured to: when a user chooses, according to a prompt from the input and output circuit 112, to delete the resident notification message, delete, according to a system permission, the resident notification message that is found by the monitoring circuit 111.

Further, the monitoring circuit 111 is configured to receive, in the notification bar, a notification message deletion instruction, and after receiving the notification message deletion instruction, search for the resident notification message in a notification message to be deleted.

Further, the monitoring circuit 111 is configured to monitor whether a new notification message is added to a notification bar, and when it is found, by means of monitoring, that a new notification message is added to the notification bar, determine whether the newly added notification message is the resident notification message.

Further, the processor 113 is configured to send a resident notification message deletion request to an operating system according to the system permission, where the resident notification message deletion request carries an attribute flag used to indicate that the notification message is the resident notification message, so that the operating system deletes the resident notification message according to the attribute flag.

Further, the input and output circuit 112 is configured to: after the monitoring circuit 111 searches for the resident notification message, display, in the notification bar, shielding prompt information, where the shielding prompt information is used to prompt whether to perform message pushing shielding for an application that pushes the resident notification message; where the processor 113 is configured to: when the user chooses, according to a prompt from the input and output circuit 112, to perform message pushing shielding for the application, send a push shielding request to the operating system according to the system permission, so that the operating system shields, according to the push shielding request, a notification message pushed by the application.

Further, the input and output circuit 112 is configured to: after the monitoring circuit 111 searches for the resident notification message, display, in the notification bar, attribute modification prompt information, where the attribute modification prompt information is used to prompt whether to perform notification message attribute modification for an application that pushes the resident notification message; where the processor 113 is configured to: when the user chooses, according to a prompt from the input and output circuit 112, to perform attribute modification for the application, send an attribute modification request to the operating system according to the system permission, where the attribute modification request carries an attribute flag used to indicate that the notification message is the resident notification message, so that the operating system modifies, into a non-resident notification message according to the attribute flag, a notification message attribute of the application that pushes the resident notification message.

Further, the processor 113 is further configured to perform a semantic analysis on the resident notification message after the monitoring circuit 111 searches for the resident notification message, and delete the resident notification message when it is found, by means of an analysis, that content of the resident notification message matches a preset content set.

The apparatus for managing a notification bar message according to this embodiment of the present invention can search, in a notification bar, for a resident notification message; after the resident notification message is found, display, in the notification bar, prompt information prompting whether to delete the resident notification message, so as to facilitate choosing performed by a user; and if the user chooses to delete the resident notification message, delete the resident notification message according to a system permission. Unlike that a third-party application is used to shield a resident notification message in the prior art, a resident notification message may be directly deleted by using an operating system of a mobile phone, and third-party application does not need to be installed, which facilitates a user operation.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. An electronic device, comprising:
a processor; and
a memory storing instructions, wherein when the instructions are executed by the processor, the instructions cause the electronic device to:
receive a first notification associated with a first application installed on the electronic device, wherein the first notification is an unread message;
receive a second notification associated with a second application installed on the electronic device, wherein the second application is different from the first application;
in response to detecting a slide down operation, display a notification bar, wherein the notification bar comprises the first notification, the second notification, and a third notification associated with a third application, wherein the third application is different from the second application and the first application, and the notification bar further comprises a first delete button and a second delete button, and wherein the first delete button corresponds to a plurality of notifications comprising the first notification and the second notification, and the second delete button corresponds to the third notification;
detect a first gesture on the first delete button;
in response to detecting the first gesture on the first delete button, delete the plurality of notifications comprising the first notification and the second notification in the notification bar, wherein the third notification remains in the notification bar after the deletion of the plurality of notifications, and wherein when the notification bar is closed a thumbnail icon corresponding to the third notification is displayed at a top area of a screen of the electronic device;
detect a second gesture on the second delete button in the notification bar; and
in response to detecting the second gesture on the second delete button, delete the third notification in the notification bar.

2. The electronic device according to claim 1, wherein the third notification is a resident notification and the first notification and the second notification are non-resident notifications.

3. The electronic device according to claim 2, wherein when the instructions are executed by the processor, the instructions further cause the electronic device to:
determine the third notification is a resident notification according to a first attribution flag of the third notification.

4. The electronic device according to claim 2, wherein the first delete button is a clear all button; and wherein deleting the plurality of notifications comprising the first notification and the second notification in the notification bar comprises: deleting all non-resident notifications in the notification bar.

5. The electronic device according to claim 1, wherein when the instructions are executed by the processor, the instructions further cause the electronic device to:
display a fourth notification associated with a fourth application in the notification bar, wherein the fourth notification is a resident notification, and a third delete button corresponds to the fourth notification.

6. The electronic device according to claim 5, wherein when the instructions are executed by the processor, the instructions further cause the electronic device to:
display shielding prompt information in the notification bar, wherein the shielding prompt information is used to prompt whether to perform notification pushing shielding for the fourth application.

7. The electronic device according to claim 5, wherein when the instructions are executed by the processor, the instructions further cause the electronic device to:
delete the fourth notification according to a shielding setting on the fourth application.

8. The electronic device according to claim 7, wherein when the instructions are executed by the processor, the instructions further cause the electronic device to:
display a fifth notification received from a third application, wherein the fifth notification is received after the third notification is deleted; and
receive a sixth notification from the fourth application, and perform notification pushing shielding for the sixth notification according to the shielding setting on the fourth application.

9. The electronic device according to claim 5, wherein when the instructions are executed by the processor, the instructions further cause the electronic device to:
display, in the notification bar, attribute modification prompt information, wherein the attribute modification prompt information prompts whether to perform notification message attribute modification for the fourth application.

10. The electronic device according to claim 9, wherein when the instructions are executed by the processor, the instructions further cause the electronic device to:
in response to a user choosing to perform attribute modification for the fourth notification, send an attribute modification request to an operating system of the electronic device according to a system permission, wherein the attribute modification request carries a third attribute flag indicating that the fourth notification is a resident notification, and wherein the operating system modifies the fourth notification into a non-resident notification according to the third attribute flag.

11. The electronic device according to claim 1, wherein when the instructions are executed by the processor, the instructions further cause the electronic device to: in response to detecting the second gesture, modify a second attribution flag of the third notification.

12. The electronic device according to claim 1, wherein in response to detecting the first gesture on the first delete button, deleting the plurality of notifications comprising the first notification and the second notification in the notification bar, wherein the third notification remains in the notification bar after the deletion of the plurality of notifications, comprises: in response to detecting the first gesture on the first delete button, performing the following:
   traversing the first notification, the second notification, and the third notification one by one;
   deleting the first notification in the notification bar when the first notification is traversed;
   deleting the second notification in the notification bar when the second notification is traversed; and
   not deleting the third notification in the notification bar when the third notification is traversed.

13. The electronic device according to claim 1, wherein when the instructions are executed by the processor, the instructions further cause the electronic device to:
   display some content of the third notification in the notification bar.

14. The electronic device according to claim 1, wherein in response to detecting the second gesture on the second delete button, deleting the third notification in the notification bar, comprises:
   in response to detecting the second gesture on the second delete button, performing the following:
   create a delete request, wherein the delete request carries a message identifier of the third notification, or the delete request carries an application identifier of the third application; and
   delete the third notification according to the delete request.

15. The electronic device according to claim 1, wherein the first gesture is a click gesture, and second gesture is a click gesture.

16. A method, comprising:
   receiving, by an electronic device, a first notification associated with a first application installed on the electronic device, wherein the first notification is an unread message;
   receiving, by the electronic device, a second notification associated with a second application installed on the electronic device, wherein the second application is different from the first application;
   in response to detecting a slide down operation, displaying, by the electronic device, a notification bar, wherein the notification bar comprises the first notification, the second notification, and a third notification associated with a third application, wherein the third application is different from the second application and the first application, and the notification bar further comprises a first delete button and a second delete button, and wherein the first delete button corresponds to a plurality of notifications comprising the first notification and the second notification, and the second delete button corresponds to the third notification;
   detecting, by the electronic device, a first gesture on the first delete button;
   in response to detecting the first gesture on the first delete button, deleting, by the electronic device, the plurality of notifications comprising the first notification and the second notification in the notification bar, wherein the third notification remains in the notification bar after the deletion of the plurality of notifications, and wherein when the notification bar is closed a thumbnail icon corresponding to the third notification is displayed at a top area of a screen of the electronic device;
   detecting, by the electronic device, a second gesture on the second delete button in the notification bar; and
   in response to detecting the second gesture on the second delete button, deleting, by the electronic device, the third notification in the notification bar.

17. The method according to claim 16, wherein the third notification is a resident notification and the first notification and the second notification are non-resident notifications.

18. The method according to claim 17, further comprising:
   determining the third notification is a resident notification according to a first attribution flag of the third notification.

19. The method according to claim 17, wherein the first delete button is a clear all button; and wherein deleting the plurality of notifications comprising the first notification and the second notification in the notification bar comprises:
   deleting all non-resident notifications in the notification bar.

20. The method according to claim 16, further comprising:
   displaying a fourth notification associated with a fourth application in the notification bar, wherein the fourth notification is a resident notification, and a third delete button corresponds to the fourth notification.

21. The method according to claim 20, further comprising:
   displaying shielding prompt information in the notification bar, wherein the shielding prompt information is used to prompt whether to perform notification pushing shielding for the fourth application.

22. The method according to claim 20, further comprising:
   deleting the fourth notification according to a shielding setting on the fourth application.

23. The method according to claim 22, further comprising:
   displaying a fifth notification received from a third application, wherein the fifth notification is received after the third notification is deleted; and
   receiving a sixth notification from the fourth application, and performing notification pushing shielding for the sixth notification according to the shielding setting on the fourth application.

24. The method according to claim 20, further comprising:
   displaying, in the notification bar, attribute modification prompt information, wherein the attribute modification prompt information prompts whether to perform notification message attribute modification for the fourth application.

25. The method according to claim 24, further comprising:
   in response to a user choosing to perform attribute modification for the fourth notification, sending an attribute modification request to an operating system of the electronic device according to a system permission, wherein the attribute modification request carries a third attribute flag indicating that the fourth notification is a resident notification, and wherein the operating system modifies the fourth notification into a non-resident notification according to the third attribute flag.

26. The method according to claim 16, further comprising: in response to detecting the second gesture, modifying a second attribution flag of the third notification.

27. The method according to claim 16, wherein in response to detecting the first gesture on the first delete button, deleting the plurality of notifications comprising the first notification and the second notification in the notification bar, wherein the third notification remains in the notification bar after the deletion of the plurality of notifications, comprises:
    in response to detecting the first gesture on the first delete button, performing the following:
    traversing the first notification, the second notification, and the third notification one by one;
    deleting the first notification in the notification bar when the first notification is traversed;
    deleting the second notification in the notification bar when the second notification is traversed; and not deleting the third notification in the notification bar when the third notification is traversed.

28. The method according to claim 16, further comprising:
    displaying some content of the third notification in the notification bar.

29. The method according to claim 16, wherein in response to detecting the second gesture on the second delete button, deleting the third notification in the notification bar, comprises:
    in response to detecting the second gesture on the second delete button, performing the following:
    creating a delete request, wherein the delete request carries a message identifier of the third notification, or the delete request carries an application identifier of the third application; and deleting the third notification according to the delete request.

30. The method according to claim 16, wherein the first gesture is a click gesture, and second gesture is a click gesture.

31. A non-transitory computer readable storage medium storing instructions executable by at least one processor, the instructions including instructions for:
    receiving a first notification associated with a first application installed on an electronic device, wherein the first notification is an unread message;
    receiving a second notification associated with a second application installed on the electronic device, wherein the second application is different from the first application;
    in response to detecting a slide down operation, displaying a notification bar, wherein the notification bar comprises the first notification, the second notification, and a third notification associated with a third application, wherein the third application is different from the second application and the first application, and the notification bar further comprises a first delete button and a second delete button, and wherein the first delete button corresponds to a plurality of notifications comprising the first notification and the second notification, and the second delete button corresponds to the third notification;
    detecting a first gesture on the first delete button;
    in response to detecting the first gesture on the first delete button, deleting the plurality of notifications comprising the first notification and the second notification in the notification bar, wherein the third notification remains in the notification bar after the deletion of the plurality of notifications, and wherein when the notification bar is closed a thumbnail icon corresponding to the third notification is displayed at a top area of a screen of the electronic device;
    detecting a second gesture on the second delete button in the notification bar; and
    in response to detecting the second gesture on the second delete button, deleting the third notification in the notification bar.

32. The non-transitory computer readable storage medium according to claim 31, wherein the third notification is a resident notification and the first notification and the second notification are non-resident notifications.

33. The non-transitory computer readable storage medium according to claim 32, wherein when the instructions are executed by the processor, the instructions further cause the electronic device to: determine the third notification is a resident notification according to a first attribution flag of the third notification.

34. The non-transitory computer readable storage medium according to claim 32, wherein the first delete button is a clear all button; and wherein deleting the plurality of notifications comprising the first notification and the second notification in the notification bar comprises: deleting all non-resident notifications in the notification bar.

* * * * *